(12) United States Patent
Foster et al.

(10) Patent No.: US 6,328,366 B1
(45) Date of Patent: Dec. 11, 2001

(54) VEHICLE STORAGE COMPARTMENT

(75) Inventors: Steven Foster, Rochester Hills; Holly Giangrande, Troy; Roch Tolinski, Howell, all of MI (US); Charlie Hopson, Lebanon, TN (US); Nicholas Kalargeros, West Midlands (GB); Rainer Grimm; Carmelo Mondello, both of Frankfurt (DE); Laurent Arquevaux, Sully sur Loire (FR)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/548,489

(22) Filed: Apr. 13, 2000

(51) Int. Cl.$^7$ ........................................................ B60N 3/12
(52) U.S. Cl. ............................ 296/37.6; 296/37.2; 293/28
(58) Field of Search ................................ 296/26.08, 26.11, 296/37.1, 37.6, 37.2, 50, 55, 57.1, 61; 293/28, 117; 414/537

(56) References Cited

U.S. PATENT DOCUMENTS

| | | | |
|---|---|---|---|
| 2,063,092 | * 12/1936 | Groden | 296/37.2 X |
| 2,080,989 | * 5/1937 | Smith | 293/117 X |
| 2,131,746 | * 10/1938 | Morrison | 296/37.2 X |
| 3,210,117 | * 10/1965 | Hall | 296/37.2 |
| 3,554,415 | * 1/1971 | Woods | 293/117 |
| 3,642,156 | * 2/1972 | Stenson | 296/61 X |
| 4,372,727 | * 2/1983 | Fredrickson et al. | 414/537 |
| 4,475,761 | * 10/1984 | Milroy et al. | 296/61 |
| 4,601,632 | * 7/1986 | Agee | 414/537 |
| 4,915,437 | * 4/1990 | Cherry | 296/37.6 |
| 5,022,697 | * 6/1991 | Hettwer | 296/37.6 |
| 5,083,830 | * 1/1992 | Mucher et al. | 296/39.2 |
| 5,273,335 | * 12/1993 | Belnap et al. | 296/61 |
| 5,312,149 | * 5/1994 | Boone | 296/61 |
| 6,042,923 | * 3/2000 | Lewis | 296/61 X |
| 6,095,587 | * 8/2000 | Shirlee et al. | 296/100.07 |

* cited by examiner

Primary Examiner—Stephen T. Gordon
Assistant Examiner—Patricia Engle
(74) Attorney, Agent, or Firm—Carlson, Gaskey & Olds

(57) ABSTRACT

A vehicle body includes an undercarriage storage compartment for storing items such as a spare tire, tools and/or other types of equipment underneath a pick-up truck bed. The vehicle body includes a generally flat truck bed bottom member that extends in a longitudinal direction along the vehicle. The bottom member is mounted to a vehicle structure such as, a vehicle frame, chassis, or unibody member. The storage compartment has a support surface extending underneath the bottom member for supporting items such as the spare tire and associated tools. The storage compartment slides to an open position to allow access to the spare tire and tools and is then returned to a closed position to store the tire and tools within the storage compartment. In one embodiment, the support surface is tiltable to allow ramp access to the truck bed.

16 Claims, 3 Drawing Sheets

VEHICLE STORAGE COMPARTMENT

BACKGROUND OF THE INVENTION

This invention relates to compartment formed underneath a vehicle body for storing items.

Pick-up trucks and sport utility vehicles typically have a rear truck bed for transporting large items. While some pick-up truck beds are enclosed with a cap or snap-on cover, many truck beds are left open so that larger items such as furniture, landscaping equipment, ladders, or other tools and accessories can be easily transported. A spare tire for the truck and the associated lift-jack and tools are usually mounted to one side of the truck bed, or are bolted underneath the truck bed. This exposes the spare tire to the external environment where the spare tire can be damaged. Additionally, locating the spare tire underneath the truck bed makes access difficult, especially in unfavorable weather conditions.

Further, storage of the spare tire and associated tools in or under an open truckbed usually does not provide safekeeping of such items. Sometimes, a bed-liner with a storage lock box is mounted within the truck bed to store tools and other accessories in the truck for an extended period of time. One disadvantage with the lock boxes is that they decrease the available cargo space. Another disadvantage with these storage lock boxes is that they are typically positioned across the back of the truck bed near the passenger compartment. This makes access difficult, requiring the vehicle operator to climb into the truck bed to remove items from the box.

Thus, it is desirable to have a compartment formed underneath the vehicle body, which can store items such as a spare tire and tools without decreasing cargo space in the truck bed. Such a compartment should also be easily accessible and capable of storing multiple items.

SUMMARY OF THE INVENTION

In a disclosed embodiment of this invention a vehicle body includes a substantially planar floor body member extending in a longitudinal direction and which is mounted to a vehicle frame or chassis member. A storage compartment with a support surface extending underneath the body member is used to store tools or other accessories. The support surface is movable relative to the body member between an open position to allow access to the tools and a closed position to store the tools within the storage compartment.

In a preferred embodiment, the compartment is defined by a bottom portion, a back portion, a top portion, and a pair of side portions that are integrally formed to each other as one piece. Thus, the vehicle has a storage compartment slidably mounted underneath a vehicle body that can be closed to protect items from the external environment.

In another embodiment, a support is spaced apart from and extending underneath the body member for supporting tools and other items. The support is pivotally mounted with respect to the body member at one end. This allows an opposing end of the support to pivot between a raised position where the support is parallel to the body member and a lowered position where the support is orientated at an angle relative to the body member. In a preferred embodiment, the support includes a secondary support member received within the support in a telescoping relationship. The secondary support member is movable between an extended position and a stowed position.

These and other features of the present invention can be best understood from the following specification and drawings, the following of which is a brief description.

DETAILED DESCRIPTION OF A PREFERRED EMBODIMENT

Figure 1:
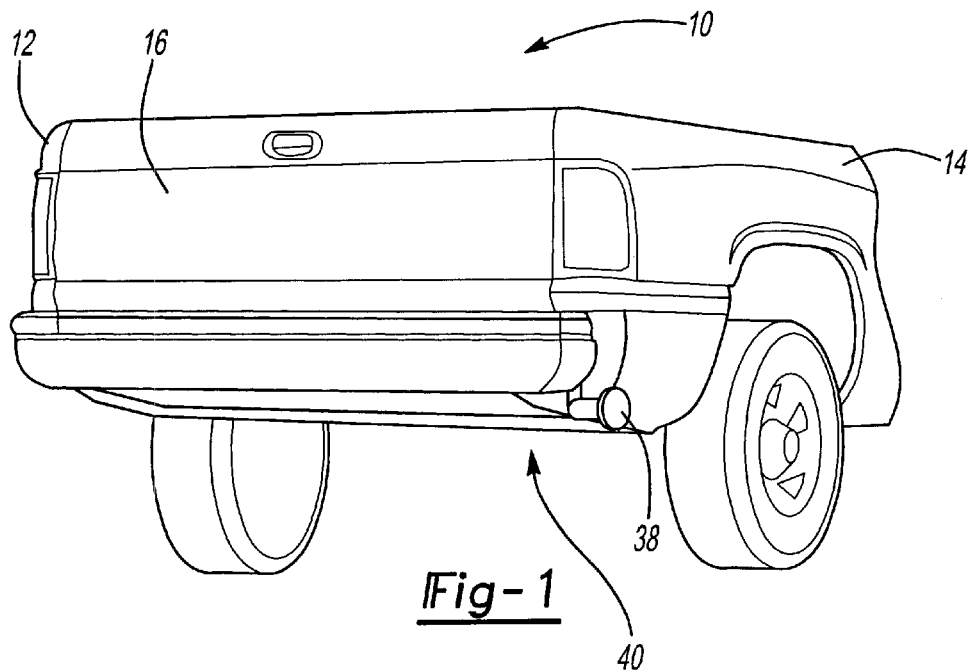
FIG. 1 is a perspective view of a vehicle body with the bumper in the retracted position.
Figure 2:
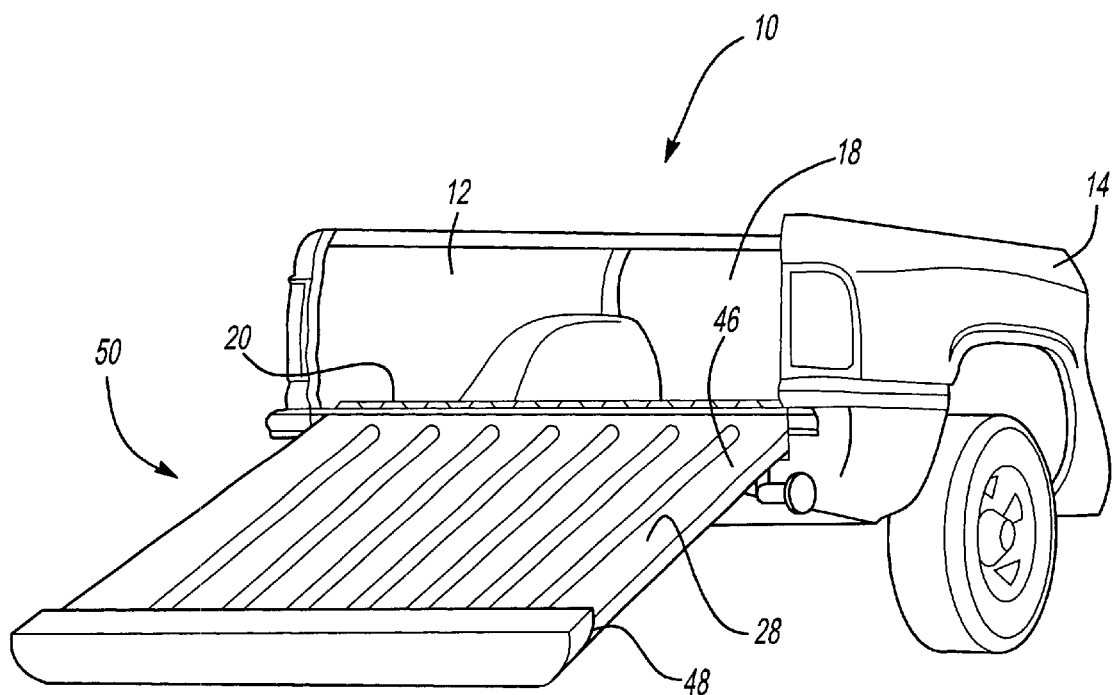
FIG. 2 is a perspective view of the vehicle of FIG. 1 showing the bumper in an extended position to form ramp.

A vehicle body is generally shown at 10 in FIGS. 1 and 2. The vehicle is preferably a pick-up truck or sport utility vehicle, however the invention can be easily incorporated into other types of vehicles. The vehicle body 10 includes a pick-up truck bed having a driver side fender 12, a passenger side fender 14, a tailgate 16, and a front connecting member 18. The tailgate 16 and front connecting member 18 connect opposing ends of the driver 12 and passenger 14 side fenders to form a box. The box is attached to a substantially planar floor body member 20 that extends in a longitudinal direction, to form a truck bed. The truck bed is mounted to a vehicle frame, chassis, or unibody member. It should be understood that the box can be made from a single piece of material that is folded together, can be made from individual pieces that are attached together, or a combination thereof.

A bumper 22 is mounted below the tailgate 16 as is known in the art. A storage compartment 24 is formed underneath the floor body member 20. A lower portion 26 of the bumper 22 is pulled outwardly, away from the tailgate 16, to allow access to the storage compartment 24. It should be understood that for certain vehicles, the entire bumper 22 might be pulled out instead of just the lower portion 26.

The storage compartment 24 has a support surface 28 that extends underneath the body member 20 for a spare tire 30, storing tools, and/or various other items. The support surface 28 is movable relative to the body member 20 between an open position to allow access to the items and a closed position to store the items within the storage compartment 24. The support surface 28 is preferably parallel to the body member 20 when in the closed position.

The storage compartment 24 is defined by the support surface 28, a back portion 32, a front portion 34, and a pair of side portions 36 interconnecting the front 34 and back 32 portions at opposing ends to form a drawer. In the preferred embodiment, the support surface 28, back portion 32, front portion 34, and side portions 36 are integrally formed together as one piece.

A locking mechanism, shown generally at 40, is used to lock the drawer with respect to the body member 20. An actuator 38 is operably connected to the locking mechanism 40 to selectively move the locking mechanism 40 between locked and unlocked positions. Preferably the actuator 38 is a latch or lever located on the bumper 22, to the side of the bumper 22, or just underneath the bumper 22. The locking mechanism 40 can be any type of locking mechanism known in the art.

The support surface 28 is slidably mounted to the body member 20 with a plurality of bearing members. In one embodiment, the bumper drawer is supported on rollers 42 that roll or slide along track members 44 mounted along the inside of the driver 12 and passenger 14 side fenders or along the vehicle frame.

In one embodiment, one end of the support surface 28 is pivotally mounted to the body member 20 at one end 46 such that an opposing end 48 of the support surface 28 is pivotable between a raised position (FIG. 1) and a lowered position (FIG. 2). In the raised position, the support surface 28 is parallel to the body member 20 and in the lowered position, the support surface 28 is orientated at an angle relative to the body member 20. When the support surface 28 is in the lowered position, a ramp 50 is formed, extending from the ground to the truck bed. This allows items such as lawn tractors, snowmobiles, etc., to be driven directly into the truck bed.

Figure 3:
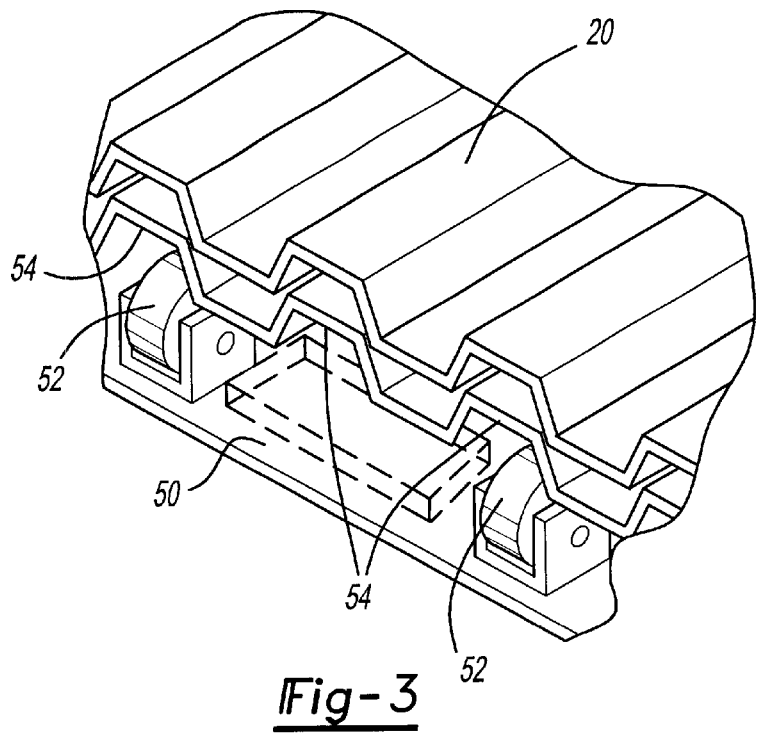
FIG. 3 is a perspective view, partially cut-away, showing the rolling mechanism used for moving the ramp between retracted and extended positions.

The ramp 50 is slidably mounted to the body member with a plurality of bearing members 52, as shown in FIG. 3. Some pick-up trucks have longitudinally extending grooves 54 along the bottom of the truck bed. In one embodiment, a plurality of roller bearing members 52 are mounted underneath the truck bed in the grooves 54. The ramp 50 is pulled outwardly along the rollers 52 to an extended position.

Figure 4:
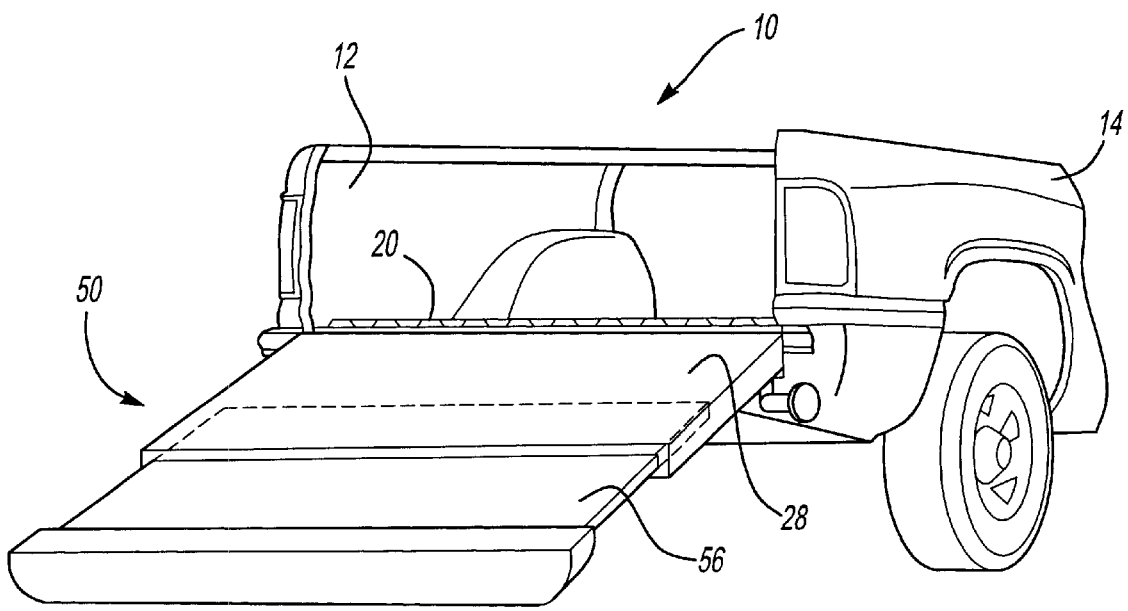
FIG. 4 is a perspective view, similar to FIG. 2, but including a secondary telescoping member for ramp extension.
Figure 5:
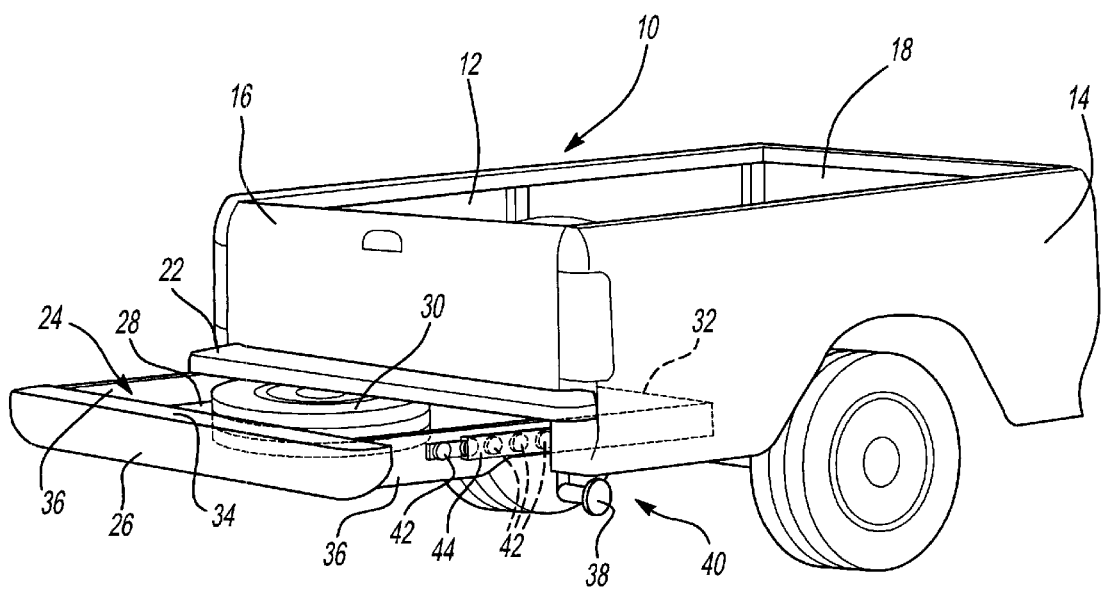
FIG. 5 is a perspective view of the vehicle of FIG. 1 showing the bumper in an extended position to form a drawer.

Optionally, the ramp includes a secondary support member 56 received within the ramp 50 in a telescoping relationship, see FIG. 4. The secondary support member 56 is movable between an extended position and a stowed position. The secondary member 56 can be moved to the extended position when the vehicle is parked on an incline. Under such conditions, the first ramp is typically unable to extend all the way to the ground and an extension 56 is necessary.

The subject invention offers a unique storage compartment that extends underneath a truck bed for storing items such as tools, a spare tire, and personal accessories. The bumper drawer provides easy access to such items and allows a vehicle operator to have access to a spare tire without having to crawl underneath the vehicle. The ramp allows lawn tractors and other equipment to be driven directly into the truck bed for transportation to other sites.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. A vehicle body comprising:
   a substantially planar floor body member extending in a longitudinal direction and mounted to a vehicle structure;
   a storage compartment having a continuous planar support surface extending laterally from one longitudinal side of said body member to an opposite longitudinal side of said body member and underneath said body member for supporting at least one item, said support surface being slidably mounted to said body member with a plurality of bearing members for movement relative to said body member between an open position to allow access to said item and a closed position to store said item within said storage compartment and wherein one end of said support surface is pivotally mounted to said body member such that an opposing end of said support surface is pivotable between a raised position where said support surface is parallel to said body member and a lowered position where said support surface is orientated at an angle relative to said body member.

2. A vehicle body as recited in claim 1 wherein said support surface is parallel to said body member.

3. A vehicle body as recited in claim 2 wherein said storage compartment is defined by said support surface, a back portion, a front portion, and a pair of side portions interconnecting said front and back portions at opposing ends to form a drawer.

4. A vehicle body as recited in claim 3 wherein said support surface, back portion, front portion, and side portions are integrally formed together as one piece.

5. A vehicle body as recited in claim 3 including a locking mechanism for locking said drawer with respect to said body member and an actuator operably connected to said locking mechanism for selectively moving said locking mechanism between locked and unlocked positions.

6. A vehicle body comprising:
   a substantially planar floor body member extending in a longitudinal direction and mounted to a vehicle structure;
   a continuous planar support spaced apart from and extending laterally underneath said body member from one longitudinal side of said body member to an opposite longitudinal side of said body member for supporting at least one item, said support being pivotally mounted with respect to said body member at one end such that an opposing end of said support pivots between a raised position where said support is parallel to said body member and a lowered position where said support is orientated at an angle relative to said body member; and
   a storage compartment for storing at least one item and defined by said support having a bottom support surface, a back portion, a front portion, and a pair of side portions interconnecting said front and back portions at opposing ends to form a drawer, said drawer being slidably mounted to said body member along said side portions to slide between an open position to allow access to said item and a closed position to store said item within said storage compartment.

7. A vehicle body as recited in claim 6 including a storage compartment for storing at least one item and defined by said support having a bottom support surface, a back portion, a front portion, and a pair of side portions interconnecting said front and back portions at opposing ends to form a drawer, said drawer being slidably mounted to said body member along said side portions to slide between an open position to allow access to said item and a closed position to store said item within said storage compartment.

8. A vehicle body as recited in claim 6 wherein said support surface is parallel to said body member when said drawer is in said closed position.

9. A vehicle body as recited in claim 8 including a locking mechanism for locking said drawer with respect to said body member and an actuator operably connected to said locking mechanism for selectively moving said locking mechanism between locked and unlocked positions.

10. A vehicle body as recited in claim 9 wherein said support surface, back portion, front portion, and side portions are integrally formed together as one piece.

11. A vehicle body comprising:
    a substantially planar floor body member extending in a longitudinal direction and mounted to a vehicle structure;

a support spaced apart from and extending underneath said body member for supporting at least one item, said support being pivotally mounted with respect to said body member at one end such that an opposing end of said support pivots between a raised position where said support is parallel to said body member and a lowered position where said support is orientated at an angle relative to said body member; and a secondary support member received within said support in a telescoping relationship, said secondary support member being movable between an extended position and a stowed position.

12. A vehicle body comprising:

a first fender located at one longitudinal side of a vehicle;

a second fender spaced apart from said first fender at an opposite longitudinal side of the vehicle;

a rear body portion including a bumper interconnecting said first and second fenders at one end;

a front body portion interconnecting said first and second fenders at an opposite end;

a substantially planar bottom portion attached to said first fender, said second fender, said rear body portion, and said front body portion to form a bed;

a storage compartment having a continuous planar support surface extending in a lateral direction generally from said first fender to said second fender and underneath said bottom portion for supporting at least one item, said support surface being movable relative to said bottom portion between an open position to allow access to said item and a closed position to store said item within said storage compartment; and a locking actuator associated with said bumper for allowing said support surface to be moved between said open and closed positions.

13. A vehicle body as recited in claim 12 wherein said support surface is generally parallel to said bottom portion.

14. A vehicle body as recited in claim 12 wherein said support surface is pivotably supported relative to said bottom portion at one end such that an opposing end of said support surface can be pivoted between a raised position and a lowered position when said support surface is in said open position.

15. A vehicle body as recited in claim 14 wherein said storage compartment is defined by a bottom, a back, a front, and a pair of sides integrally formed to each other as one piece.

16. A vehicle body comprising:

a first fender located at one longitudinal side of a vehicle;

a second fender spaced apart from said first fender at an opposite longitudinal side of the vehicle;

a rear body portion including a bumper interconnecting said first and second fenders at one end;

a front body portion interconnecting said first and second fenders at an opposite end;

a substantially planar bottom portion attached to said first fender, said second fender, said rear body portion, and said front body portion to form a bed;

a storage compartment having a support surface extending underneath said bottom portion for supporting at least one item, said support surface being movable relative to said bottom portion between an open position to allow access to said item and a closed position to store said item within said storage compartment, said support surface being pivotably supported relative to said bottom portion at one end such that an opposing end of said support surface can be pivoted between a raised position and a lowered position when said support surface is in said open position wherein said support surface includes a secondary support member received within said support surface in a telescoping relationship, said secondary support member being movable between an extended position and a stowed position; and a locking actuator associated with said bumper for allowing said support surface to be moved between said open and closed positions.

* * * * *